US012804066B2

(12) United States Patent
Kim et al.

(10) Patent No.: US 12,804,066 B2
(45) **Date of Patent: *Nov. 17, 2026**

(54) MOBILE TERMINAL AND CONTROL METHOD THEREFOR

(71) Applicant: LG ELECTRONICS INC., Seoul (KR)

(72) Inventors: Changmok Kim, Seoul (KR); Jinhee Lee, Seoul (KR); Eunkyung Choi, Seoul (KR); Junho Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 202 days.

This patent is subject to a terminal disclaimer.

(21) Appl. No.: 18/812,870

(22) Filed: Aug. 22, 2024

(65) Prior Publication Data

US 2024/0422252 A1 Dec. 19, 2024

Related U.S. Application Data

(63) Continuation of application No. 17/756,005, filed as application No. PCT/KR2019/015543 on Nov. 14, 2019, now Pat. No. 12,081,691.

(51) Int. Cl.

| | |
|---|---|
| ***H04M 1/04*** | (2006.01) |
| ***H04M 1/02*** | (2006.01) |
| *G06F 3/0482* | (2013.01) |
| *G06F 3/0488* | (2022.01) |

(52) U.S. Cl.

CPC ....... *H04M 1/0268* (2013.01); *H04M 1/0235* (2013.01); *G06F 3/0482* (2013.01); *G06F 3/0488* (2013.01); *H04M 2250/22* (2013.01)

(58) Field of Classification Search

CPC ............ H04M 1/0268; H04M 1/0235; H04M 2250/22; G06F 3/0482; G06F 3/0488

USPC ........................................................ 455/575.4

See application file for complete search history.

(56) References Cited

U.S. PATENT DOCUMENTS

| | | | | |
|---|---|---|---|---|
| 12,081,691 | B2 * | 9/2024 | Kim .................... | H04M 1/0268 |
| 2016/0357433 | A1 | 12/2016 | Song et al. | |
| 2016/0378270 | A1 | 12/2016 | Lee et al. | |
| 2017/0364119 | A1 | 12/2017 | Lee et al. | |
| 2018/0364827 | A1 | 12/2018 | Chung | |

(Continued)

FOREIGN PATENT DOCUMENTS

| | | |
|---|---|---|
| KR | 10-2014-0108919 | 9/2014 |
| KR | 10-2016-0031363 | 3/2016 |

(Continued)

OTHER PUBLICATIONS

IP.com search History (Year: 2026).*

(Continued)

*Primary Examiner* — Moustapha Diaby

(74) *Attorney, Agent, or Firm* — LEE, HONG, DEGERMAN, KANG & WAIMEY

(57) ABSTRACT

The present specification provides a mobile terminal, which can simultaneously enable unlocking and display expansion, and a control method therefor. A mobile terminal of the present invention comprises a flexible display which can expand in size. If a knock code via a user's touch input on the display unit matches a preconfigured pattern, a display positioned on the front side can expand in size as the mobile terminal unlocks.

20 Claims, 17 Drawing Sheets

(56) References Cited

U.S. PATENT DOCUMENTS

| | | | |
|---|---|---|---|
| 2018/0374452 A1 | 12/2018 | Choi et al. | |
| 2019/0261519 A1 | 8/2019 | Park et al. | |
| 2019/0278336 A1 | 9/2019 | Choi et al. | |
| 2019/0281154 A1 | 9/2019 | Choi et al. | |
| 2019/0346954 A1 | 11/2019 | Jung et al. | |
| 2019/0384438 A1* | 12/2019 | Park | G06F 3/0485 |
| 2021/0034210 A1 | 2/2021 | Chung et al. | |
| 2022/0385750 A1 | 12/2022 | Kim et al. | |

FOREIGN PATENT DOCUMENTS

| | | |
|---|---|---|
| KR | 10-2016-0144198 | 12/2016 |
| KR | 10-2017-0000553 | 1/2017 |
| KR | 10-2017-0083404 | 7/2017 |
| KR | 10-2017-0141438 | 12/2017 |
| KR | 10-2018-0079052 | 7/2018 |

OTHER PUBLICATIONS

U.S. Appl. No. 17/756,005, Notice of Allowance dated Apr. 30, 2024, 17 pages.

Korean Intellectual Property Office Application No. 10-2022-7015387, Notice of Allowance dated Jun. 20, 2025, 8 pages.

PCT International Application No. PCT/KR2019/015543, International Search Report dated Aug. 13, 2020, 10 pages.

Korean Intellectual Property Office Application No. 10-2022-7015387, Office Action dated Oct. 28, 2024, 6 pages.

European Patent Office Application Serial No. 19952939.7, Search Report dated Jun. 23, 2023, 9 pages.

* cited by examiner (a)

(b)

(a)

(b)

(a)

(b)

MOBILE TERMINAL AND CONTROL METHOD THEREFOR

CROSS-REFERENCE TO RELATED APPLICATIONS

This application is a continuation of U.S. patent application Ser. No. 17/756,005, filed on May 13, 2022, which is the National Stage filing under 35 U.S.C. 371 of International Application No. PCT/KR2019/015543, filed on Nov. 14, 2019, the contents of which is hereby incorporated by reference herein in its entirety.

TECHNICAL FIELD

The present disclosure relates to a mobile terminal, and relates to a mobile terminal having a size-variable flexible display and method for controlling the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with an ubiquitous computing environment. In other words, the display device has evolved into a smart device that enables connectivity to a network and continuous computing.

In one example, recently, a flexible display capable of large deformation with sufficient elasticity has been developed. Such flexible display may be deformed to a degree of being able to be rolled. The mobile terminal may accommodate the rolled flexible display and may protrude the display from a body thereof to a desired size. Thus, the mobile terminal may have a more compact structure using the flexible display. In addition, as the mobile terminal includes such a rollable display, the mobile terminal may be referred to as a rollable mobile terminal.

To use such a rollable mobile terminal, a display may be withdrawn from a body, and at the same time as this withdrawal, the display may be expanded to a size desired by a user. Meanwhile, the user may feel uncomfortable in the course of a dual process of unlocking the rollable mobile terminal in a general manner and then expanding the display.

Therefore, there is a need for a new method of controlling a mobile terminal to minimize the above problem and provide convenience to a user.

DISCLOSURE

Technical Task

One purpose of an embodiment of the present disclosure is to provide a mobile terminal capable of extending a display and a method for controlling the same.

Another purpose of an embodiment of the present disclosure is to provide a mobile terminal capable of both unlocking and display expansion by inputting a knock code of a preset pattern.

Furthermore, another purpose of an embodiment of the present disclosure is to solve various problems not mentioned herein. Those skilled in the art may understand the spirit of the specification and the drawings.

Technical Solutions

In one technical aspect of the present disclosure, provided is a mobile terminal including a body varying in size, a flexible display including a first display located on a front side of the body, a second display located on one lateral side of the body and a third display located on a rear side of the body, a drive unit expanded in a direction of the one lateral side of the body to expand a size of the first display, a sensing unit detecting an input signal, and a controller configured to, based on the input signal matching a preset pattern, release locking of the mobile terminal and control the drive unit to expand the size of the first display, wherein the input signal may include a knock code through a user's touch input onto the flexible display and wherein the flexible display may have the third display contracted when the first display is expanded.

The knock code may include a touch input of consecutively knocking a prescribed region of the flexible unit within a reference time.

The prescribed region may include a plurality of divided grids and the knock code may be a password generated from a user-set sequence of the grids from each of which a touch input is detected The prescribed region may be located on the second display.

The knock code may include a touch input of consecutively knocking the prescribed region of each of the first and third displays within a reference time.

Based on detecting the knock code, the controller may display a guide text indicating that the size of the first display is expanded on the first display.

Based on receiving a notification in a locked state of the mobile terminal, the input signal may include the knock code and a touch & drag in a specific direction with respect to the knock code and the controller may release the locking of the mobile terminal, expand the size of the first display, and execute an application for the notification on the first display.

The specific direction may be the same as a direction in which the first display is expanded.

The notification may be related to at least one of a phone call, a message, or a Social Network Service (SNS).

Based on receiving a notification in a locked state of the mobile terminal, the input signal may include a knock code detected from the second display and the controller may release the locking of the mobile terminal, expand the size of the first display, and execute an application for the notification on the first display.

The first display of the flexible display may be expandable into one of a plurality of sizes and based on inputting the knock code, the controller may display a selection menu for selecting any one of a plurality of the sizes on the first display.

The selection menu may be displayed on a region having the knock code inputted thereto by the user in the first display.

In another technical aspect of the present disclosure, provided is a mobile terminal including a body varying in size, a flexible display including a first display located on a front side of the body, a second display located on one lateral side of the body and a third display located on a rear side of the body, a drive unit expanded in a direction of the one lateral side of the body to expand a size of the first display, a sensing unit detecting an input signal, and a controller configured to expand the size of the first display and display a standby screen on the first display based on the input signal matching a preset pattern, wherein the flexible display may have the third display contracted when the first display is expanded.

The input signal may include a combination of a knock code through a user's touch input on to the flexible display and a user's gesture action.

The knock code may include a touch input of consecutively knocking a prescribed region of the flexible display within a reference time.

The user's gesture action may include a swipe action performed on one side direction of the mobile terminal and the one side direction may be the same as a direction in which the first display is expanded.

The input signal may include a knock code of consecutively knocking a prescribed region of the second display within a reference time.

The input signal may include a swipe action performed in one side direction after fingerprint recognition.

After the fingerprint recognition, the controller may display information for guiding the swipe action on the first display.

The input signal may include fingerprint recognition.

Advantageous Effects

According to an embodiment of the present disclosure, the mobile terminal capable of extending the display and the method for controlling the same may be provided.

Specifically, when a preset knock code is inputted, the mobile terminal is unlocked and the display is expanded, so that a user may immediately use the expanded display.

Further, according to another embodiment of the present disclosure, there are additional technical effects not mentioned herein. Those skilled in the art may understand the spirit of the specification and the drawings.

BEST MODE FOR DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help casily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

The terminology used in the present disclosure is used only to describe specific embodiments, not intended to limit the present disclosure. A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
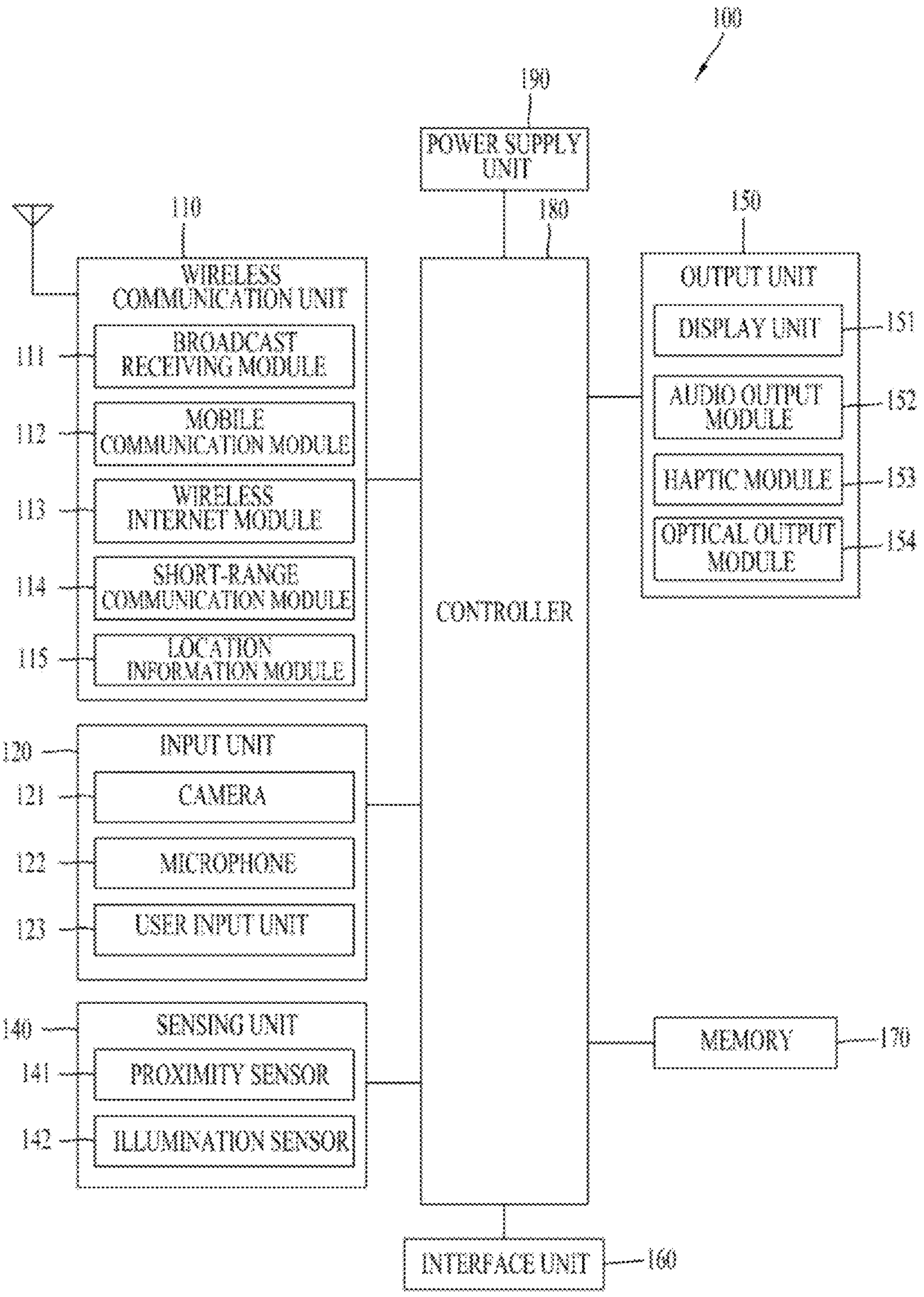
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
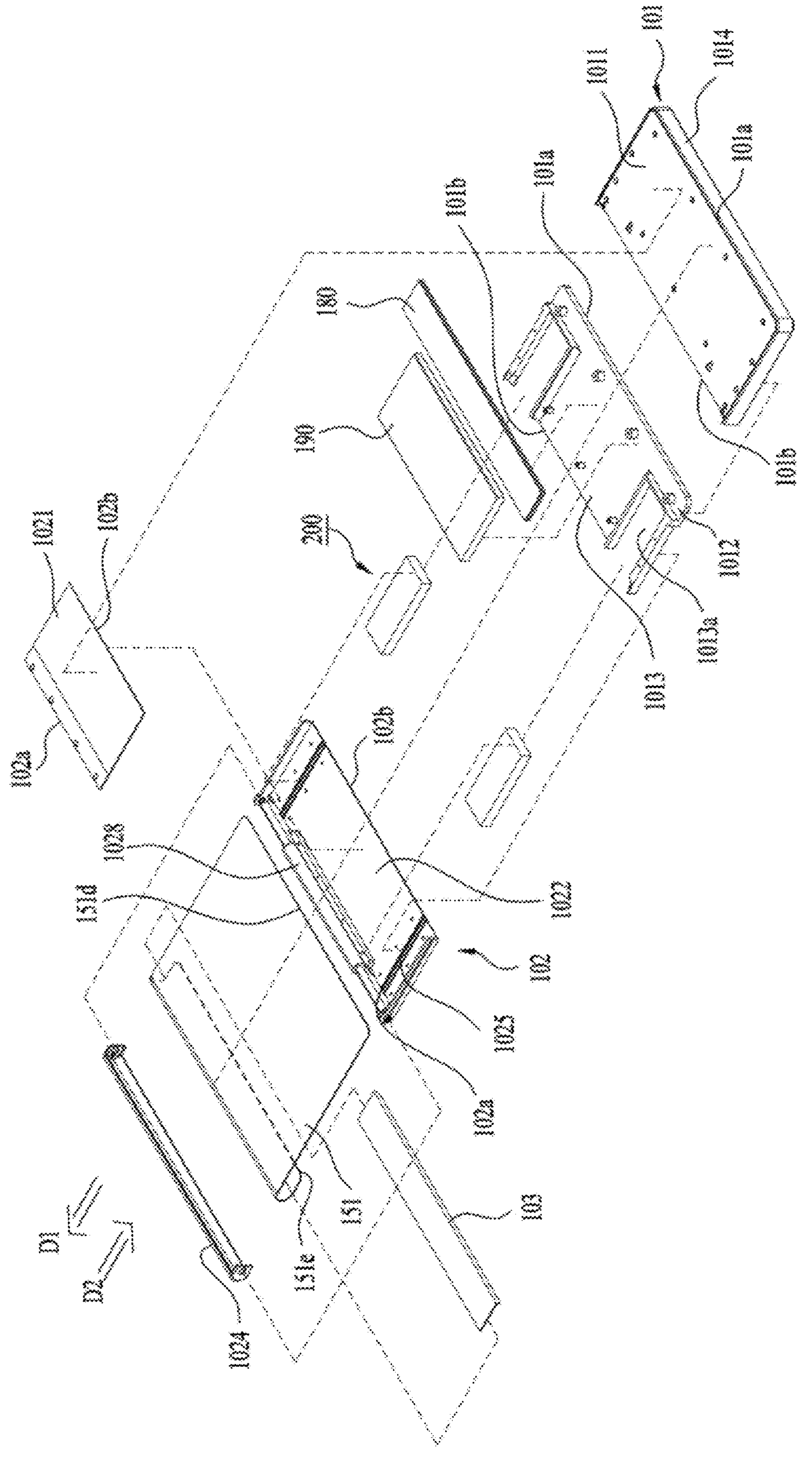
FIG. 2 is an exploded perspective view of a mobile terminal according to one embodiment.
Figure 3:
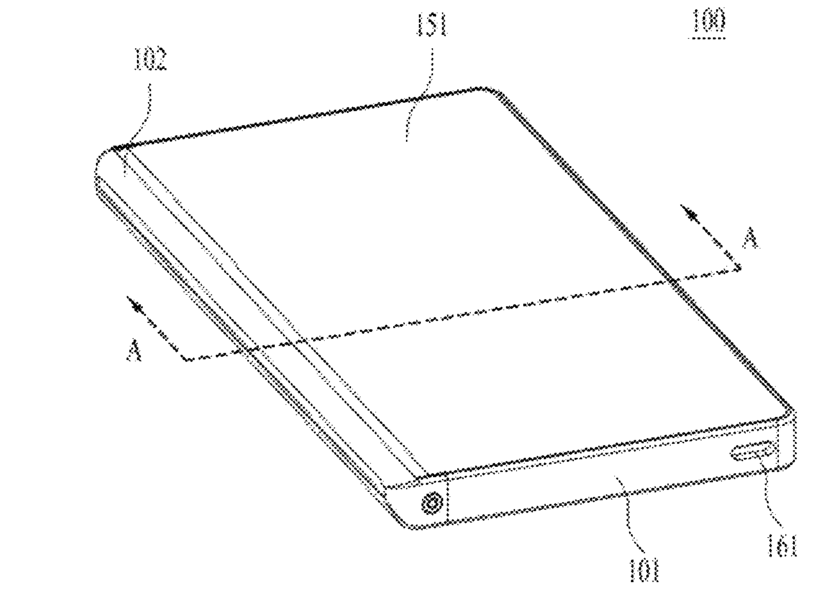
FIG. 3 shows perspective views respectively illustrating a first state and a second state viewed from one side of a mobile terminal according to one embodiment.
Figure 3:
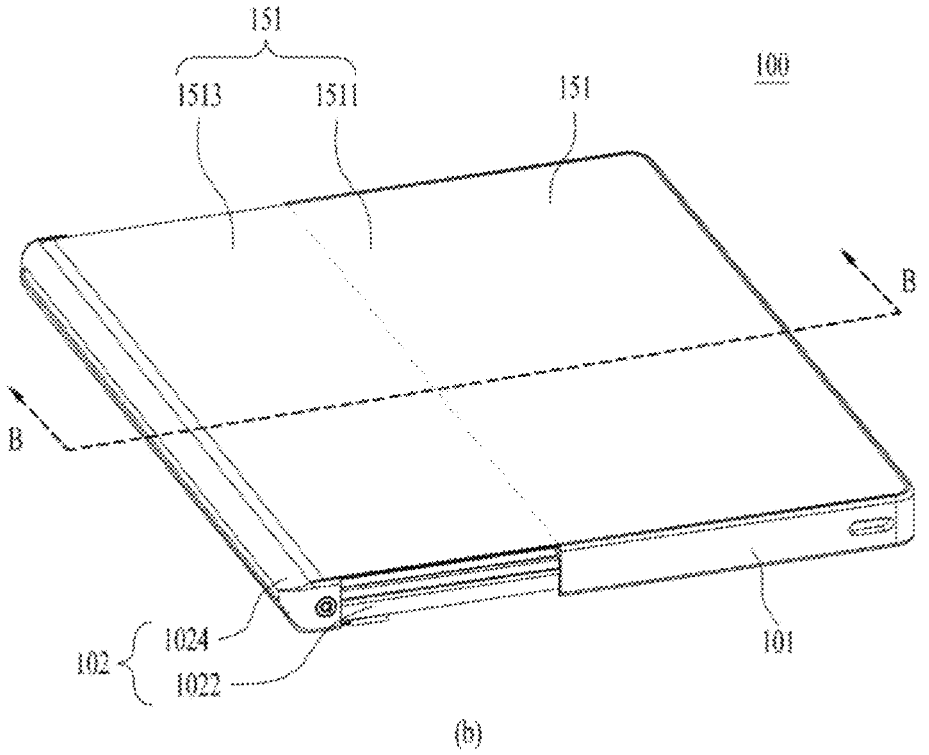
Figure 4:
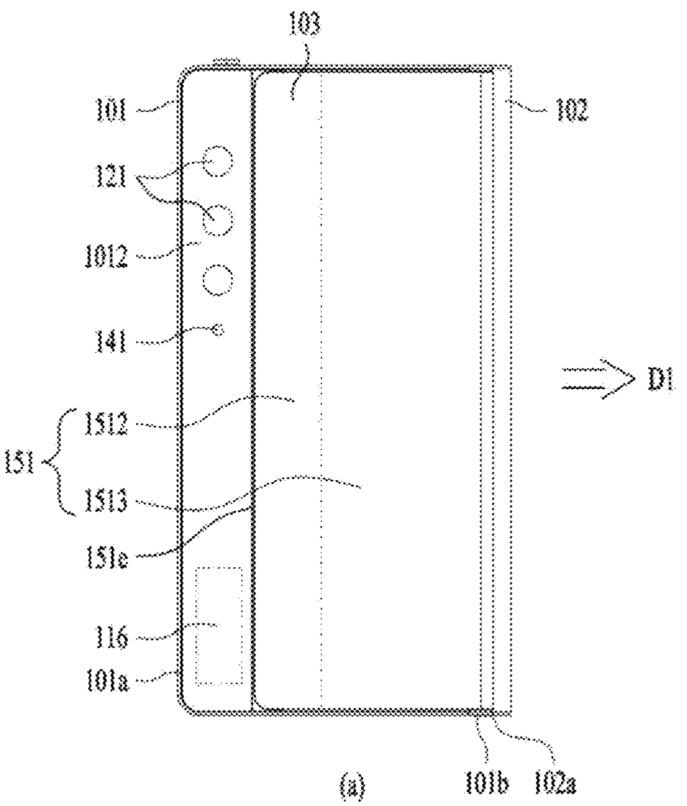
FIG. 4 shows rear face views respectively illustrating a first state and a second state of a mobile terminal according to one embodiment.
Figure 4:
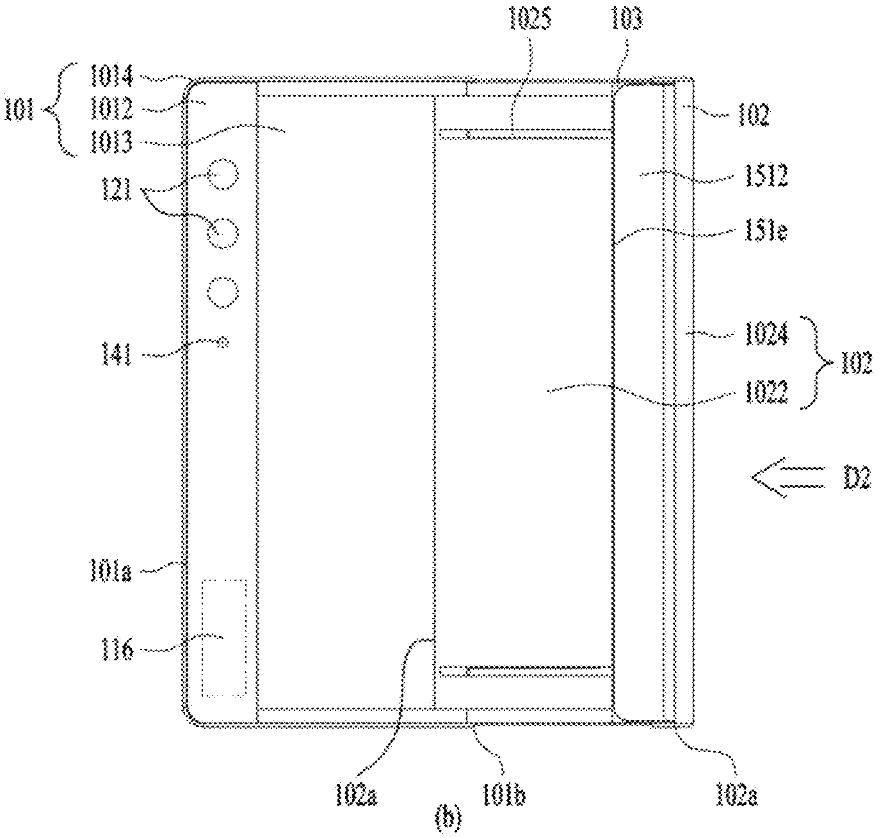
Figure 5:
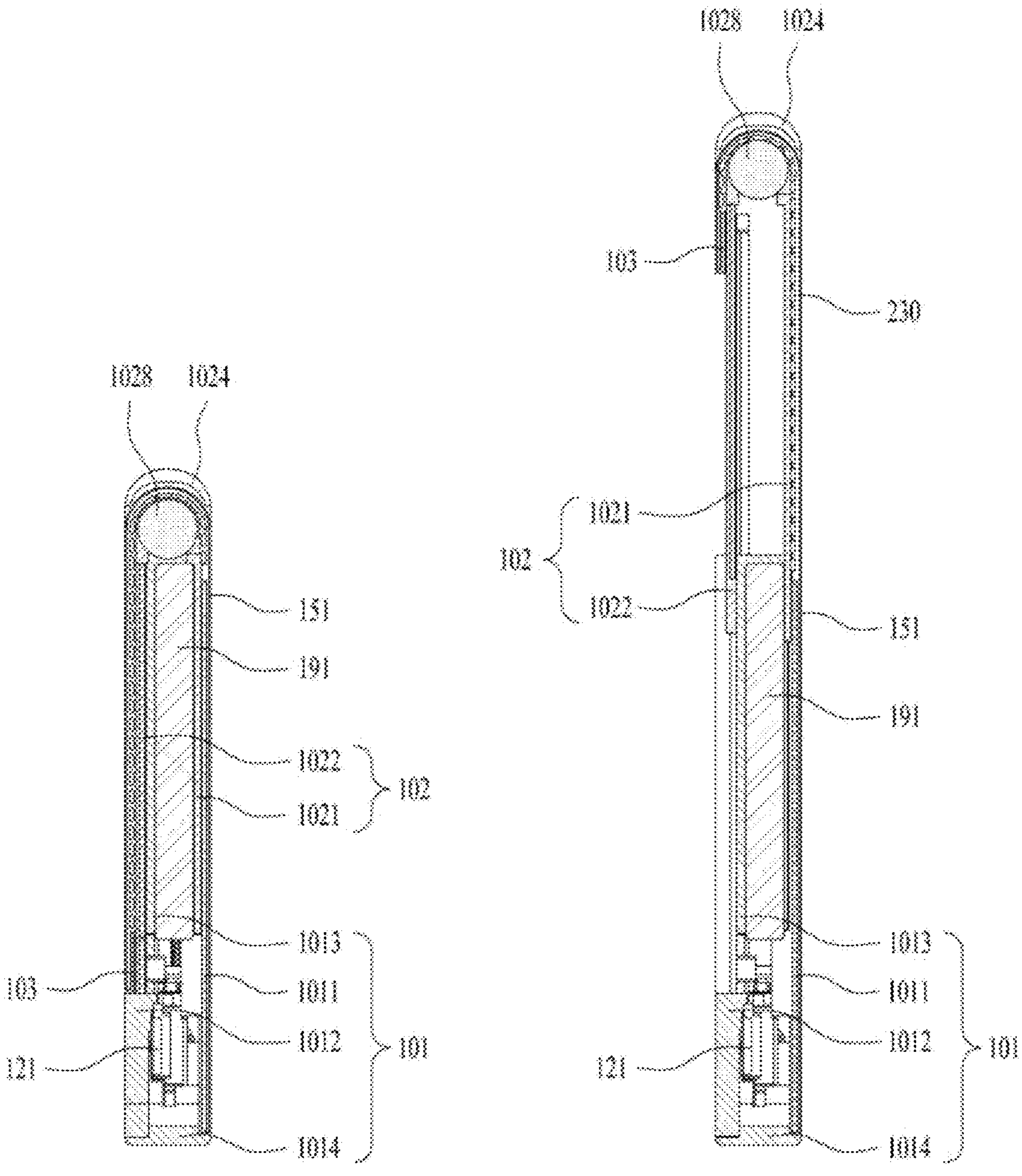
FIG. 5 shows cross-sectional views respectively taken along a line A-A and a line B-B of FIG. 3.

FIG. 2 is an exploded perspective view of a mobile terminal according to one embodiment. Further, FIG. 3 shows perspective views respectively illustrating a first state and a second state viewed from one side of a mobile terminal according to one embodiment. Further, FIG. 4 shows rear face views respectively illustrating a first state and a second state of a mobile terminal according to one embodiment. Further, FIG. 5 shows cross-sectional views respectively taken along a line A-A and a line B-B of FIG. 3. In these drawings, FIGS. 3 (*a*), 4 (*a*), and 5 (*a*) show a first state of the mobile terminal, and FIGS. 3 (*b*), 4 (*b*), and 5 (*b*) show a second state of the mobile terminal.

As shown, a mobile terminal 100 in a first state is contracted, and has a smaller size than the mobile terminal 100 in a second state. In addition, a size of a display unit 151 located disposed on a front face of the mobile terminal 100 also becomes smaller than that of the display unit 151 in the second state. The mobile terminal 100 of the first state is expanded in a first direction D1 to be in the second state. In the second state, the size of the mobile terminal 100 and a size of a front face of the display unit 151 are larger than those in the first state. In a following description, a direction in which the mobile terminal 100 and the display 151 thereof are extended or enlarged is referred to as a first direction D1, a direction in which the mobile terminal 100 and the display 151 thereof are contracted or retracted, or reduce to be converted into the first state from the second state is referred to as a second direction D2, and a direction perpendicular to the first and second directions D1 and D2 is referred to as a third direction.

The mobile terminal 100 of the present disclosure may be converted from the first state in which the display unit 151 is positioned on the front face of a bar-shaped mobile terminal as shown in FIG. 3 (*a*) into the second state as shown in FIG. 3 (*b*) by enlarging a screen thereof. In the second state, an area of the front face of the display unit 151 is enlarged, and an area of a rear face of the display unit 151 is reduced as shown in FIG. 4 (*b*). That is, the display unit 151 positioned on a rear face of the mobile terminal 151 in the first state moves to the front face of the mobile terminal 100 in the second state.

As such, the display unit may use a flexible display 151 that may be bent such that the position of the display unit may be varied. The flexible display is a lightweight, unbreakable, and durable display that is built on a thin and flexible substrate that may be bent, crooked, folded, twisted, or rolled while retaining properties of a conventional flat panel display.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display 151 is not deformed (e.g., a state of having an infinite curvature radius, hereinafter referred to as a basic state), a display region of the flexible display 151 becomes flat. In a state in which the flexible display 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color.

The flexible display 151 may be in a curved state (e.g., a vertically or horizontally curved state) rather than a flat state in the basic state. In this case, when the external force is applied to the flexible display 151, the flexible display 151 may be deformed into the flat state (or a less curved state) or more curved state.

The flexible display 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display 151. Such deformation detection means may be included in the sensing unit 140 (see FIG. 1).

The deformation detection means may be disposed in the flexible display 151 or a case (first to third frames 101 to 103 to be described later) to detect information related to the deformation of the flexible display 151. In this connection, the information related to the deformation may include a direction in which the flexible display 151 is deformed, a degree of the deformation, a deformed position, a deformed time, an acceleration at which the deformed flexible display 151 is restored, and the like. In addition, the information related to the deformation may be various information that may be detected due to the bending of the flexible display 151.

In addition, the controller 180 may change information displayed on the flexible display 151 or generate a control signal for controlling a function of the mobile terminal 100 based on the information related to the deformation of the flexible display 151 detected by the deformation detection means.

The state conversion (first or second state) of the flexible display 151, e.g., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display 151 is in the first state, the mobile terminal 100 or the flexible display 151 may be converted into the second state by the user or an application command without the external force applied by the user. As such, in order for the flexible display 151 to be automatically deformed without the external force, the mobile terminal 100 may include a driving unit 200 to be described later.

The flexible display 151 of the present disclosure is bent 180 degrees while being rolled on one of both sides of the mobile terminal 100. Thus, a portion of the display unit 151 is disposed on the front face of the mobile terminal 100 based on such side, and the other portion thereof is disposed on the rear face of the mobile terminal 100. A portion of the display unit 151 located on the front face of the mobile terminal 100 may be fixed to the front face so as not to move. Further, the other portion thereof located on the rear face of the mobile terminal 100 may be movable to the rear face.

In addition, the display unit 151 may be rolled on or released from the side. Accordingly, the portion disposed on the rear face of the mobile terminal 100 moves, so that the size of the portion disposed on the front face of the mobile terminal 100 may be adjusted. Since the area of the flexible display 151 is determined and the flexible display 151 is formed of one continuous body, an area of the portion on the rear face decreases as an area of the portion on the front face increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display 151 that covers not only the front face of the mobile terminal 100 but also the rear face thereof. For this reason, the antenna may be implemented on the flexible display 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

With reference to FIGS. 2 to 5, a detailed configuration of the mobile terminal 100 of the present disclosure will be described in detail below. A following description will be achieved basically with reference to FIG. 2 illustrating an overall configuration. FIGS. 3 to 5 are referred to explain detailed features of corresponding components in the first and second states of the mobile terminal 100.

The mobile terminal 100 of the present disclosure includes a main frame in which components are mounted, and the main frame of the present disclosure may vary in size in the first direction as shown in FIG. 2. One or more frames move relative to each other, and sizes thereof may vary in the first direction. Electronic components are mounted in the main frame, and the flexible display 151 is located out of the main frame.

Since the mobile terminal 100 of the present disclosure includes the flexible display, the flexible display 151 may be combined in a form surrounding a front face and a rear face of the main frame. The main frame may include first to third frames 101 to 103. The main frame may include the first frame 101, the second frame 102 moving in the first direction with respect to the first frame 101, and the third frame 103 moving in the first direction with respect to the second frame 102. The first frame 101 and the second frame 102 include front portions, a rear portions, and side portions, respectively, and are coupled to each other. Thus, the mobile terminal 100 may have a hexahedral outer shape by such coupled first and second frames 101 and 102. In consideration of an illustrated configuration of the first to third frames 101 to 103, movements of the second and third frames 102 and 103 may be a slide movement.

First, the first frame 101 corresponds to a main body of the mobile terminal 100, and may have a space therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and a first rear portion 1012 and a second rear portion 1013 disposed at a rear portion of the mobile terminal.

Such first front portion 1011, first rear portion 1012, and second rear portion 1013 may be respectively formed of plate-shaped members that are generally flat. The first rear portion 1012 and the second rear portion 1013 may be respectively formed of separate members coupled to each other or may be formed of one member as shown. The first front portion 1011 and the first rear portion/second rear portion 1012 and 1013 may be spaced apart from each other at a predetermined spacing to define a predetermined space therebetween, and may be connected to each other by a side portion 1014. The controller 180 and the power supply unit 190 may be accommodated as components of the mobile terminal 100 in the space in the first frame 101. For example, the controller 180 may be a circuit board including a processor and an electronic circuit for controlling the operation of the mobile terminal, and the power supply unit 190 may be a battery and related components. In addition, the second frame 102 and the driving unit 200 to be described later may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. The flexible display 151 may be damaged when being bent. Thus, the flexible display 151 may be formed to be bent with a predetermined curvature.

The display unit 151 may be divided into a fixed portion and a variable portion. The fixed portion means a portion fixed to the frame. Because of being fixed to the frame, the fixed portion maintains a constant shape without changing a bending degree. On the other hand, the variable portion means a portion in which a bending angle or a position of the bent portion changes. The variable portion in which the position or bending angle of the bent portion changes requires a structure for supporting a rear face of the variable portion in response to the change.

A first region of the display unit 151 may be coupled to the first front portion 1011 corresponding to the front face of the mobile terminal 100.

In one example, as shown in FIG. 4, various physical input units 120 for manipulation of the mobile terminal 100 and sensing units 140 may be located on the first rear portion 1012, and the display unit 151 may be disposed only on the second rear portion 1013. Since the first rear portion 1012 does not overlap the flexible display 151 regardless of the state of the mobile terminal, and is always exposed to the outside, the input unit 120 such as various buttons, switches, the camera 121, and a flash, and the sensing unit 140 such as a proximity sensor 141 may be arranged on the first rear portion 1012. In a conventional bar-shaped terminal, a display unit is provided only on a front face of the terminal. Therefore, a main camera is placed on a rear face of the terminal in order for the user to capture an object at an opposite side while looking through the display unit. On the other hand, an additional auxiliary camera is required to be disposed on the front face of the terminal in order for the user to capture himself or herself while viewing himself or herself through the display unit.

However, the display unit 151 is positioned both the front face and the rear face of the mobile terminal 100 of the present disclosure. Therefore, when the user captures himself or herself, a display unit on the same face as the camera 121, that is, the portion of the display 151 on the rear face of the mobile terminal 100 in the drawing may be used. Further, when the user captures the object on the opposite side of the user, a display unit on the opposite face of the camera 121, that is, the portion of the display unit 151 on the front face of the mobile terminal 100 in the drawing may be used. For this reason, the mobile terminal 100 may capture the object on the opposite side of the user and capture the user using the single camera 121. The camera may include a plurality of cameras having different angles of view, such as wide angle, super wide angle, and telephotographic cameras. In addition to the camera, a proximity sensor sound output unit may be positioned on the first rear portion 1012, and an antenna 116 may be installed on the first rear portion 1012.

The side portion 1014 may extend along edges of the first front portion 1011 and the first rear portion/second rear portion 1012 and 1013 to surround the first frame 101, and may form the outer shape of the mobile terminal 100. However, as mentioned above, since the second frame 102 is accommodated in the first frame 101 and is movably coupled thereto, in order to allow the movement of the second frame 102 relative to the first frame 101, a portion of the first frame 101 needs to be opened. As shown in FIG. 2, as an example, the second frame 102 is movably coupled to one of both side portions of the first frame 101, so that the side portion 1014 may not be formed on the same side portion, and thus, the portion of the first frame 101 may be opened. Accordingly, the first frame 101 may include a substantially closed first side portion **101*a* and a second side portion 101*b*, which is disposed to be opposite to the first side portion 101*a* and is opened. The side portion 1014 is exposed to the outside of the mobile terminal 100, so that an interface unit 160 for connecting a supply port or an car jack, the user input unit 120 such as a volume button, or the like may be disposed on the side portion 1014. When containing a metal material, the side portion 1014** may serve as an antenna.

The second rear portion 1013 of the first frame 101 may be covered by the display unit, but may be disposed on the front face of the display unit using a transparent material.

The second frame 102 may include a second front portion 1021 disposed at the front portion of the mobile terminal 100 and a third rear portion 1022 disposed at the rear portion of the mobile terminal 100. Like the first front portion 1011 and the first rear portion 1012 of the first frame 101, the second front portion 1021 and the third rear portion 1023 may be formed of plate-shaped members that are generally flat. In addition, the second frame 102 also accommodates various components, and should not interfere with the components accommodated in the first frame 101 during the movement. Accordingly, the second front portion 1021 and the third rear portion 1022 may be coupled to each other in a state of being spaced apart from each other to define a predetermined space therebetween, and may have shapes that do not interfere with the components in the first frame 101.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 1028 rotatably disposed therein. The roller 1028 may be disposed at any position inside the second frame 102. However, the display unit 151 should be spread flat on the front face and the rear face of the mobile terminal 100 to provide a good quality screen to the user. Further, for such spread, a proper tension should be provided on the display unit 151. In order to provide the proper tension, the roller 1028 may be disposed at a first directional end of the second frame 102. The roller 1028 may extend in the third direction, and may be rotatably coupled to the second frame 102.

The display unit 151 may be rolled around the roller 1028 while being gently bent with a predetermined curvature. The flexible display 151 may include a first face on which a video is output and exposed to the outside and an inner face facing the frame at the opposite side. The roller 1028 may be installed to rotate freely in the second frame 102 while being in contact with the inner face of the display unit 151. Accordingly, the roller 1028 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (e.g., the first direction D1 or the second direction D2) relative to the second frame 102. The roller 1028 may guide such movement while rotating.

In addition, the roller 1028 is disposed on a first side portion 102*a* of the second frame 102, and the first side portion 102*a* actually corresponds to an outermost side portion of the mobile terminal 100. When the first side portion 102*a* of the second frame 102 is exposed, the display unit 151 rolled on the roller 1028 may be damaged. Accordingly, the second frame 102 may include a side frame 1024 disposed on the first side portion 102*a*.

The side frame 1024 extends in the longitudinal direction of the second frame 102 to cover the first side portion 102*a*, thereby protecting the roller 1028 and the display unit 151 rolled thereon. That is, the side frame 1024 covers the side face of the display unit 151, and the side face thereof is located in the third region. The first to third regions are at specified positions on the flexible display and do not change in size or position, but the sizes of the front face and the rear face, and the position of the side face are determined based on the state of the main frame.

The first region and the second region correspond to the fixed portion described above. The third region corresponds to the variable portion described above, and may vary in position depending on the state of the mobile terminal. Because the side face is rolled by the roller, the side face is bent with the predetermined curvature, and an inner face of the side frame may include a curved face corresponding to the curvature of the side face.

Because of the side frame 1024, the second frame 102 may have the substantially closed first side portion 102*a*, and the side frame 1024 may substantially form the outer shape of the mobile terminal 100 together with the side face 1014 of the first frame 101. In addition, the second frame 102 may include a second side portion 102*b* that is disposed opposite the first side portion 102*a* to minimize interference with the components within the first frame 101 during the movement, and is opened.

Such a second frame 102 is movably coupled to the first frame 101, and thus may slide in the predetermined first or second direction D1 or D2 relative to the first frame 101. More specifically, the second frame 102 may be movably coupled to the first frame 101 through the side portion of the first frame 101, more precisely, through the opened second side portion 101*b*, as shown. More specifically, the second side portion 102*b* of the second frame is disposed relatively adjacent to the first side portion 101*a* of the first frame 101 which is closed. Accordingly, the first side portion 102*a* of the second frame may be disposed to be opposite to the first side portion 101*a*. Accordingly, the second side portion 102*b* is inserted into the first frame 101 through the side portion of the first frame, that is, the second side portion 101*b* thereof. The first side portion 102*a* is not inserted into the first frame 101 but is always located outside the first frame 101, thereby forming the outer shape of the mobile terminal 100 as described above. However, when necessary, such first side portion 102*b* of the second frame 102 may also be inserted into the first frame 101.

Because of such positional relationship, the second frame 102 may extend from or contract to the first frame 101 in a direction perpendicular to the longitudinal direction of the mobile terminal 100 or the first frame 101. That is, the first and second directions D1 and D2 may basically be directions perpendicular to the longitudinal direction of the mobile terminal 100 or the first frame 101. Further, the first and second directions D1 and D2 may also be described as the lateral direction or the horizontal direction of the mobile terminal 100 or the first frame 101. In addition, during the movement in the first direction D1, the second frame 102 extends from the first frame 101. Accordingly, the first direction D1 may be a direction in which the second frame 102 moves away from the first frame 101, that is, moves outwardly of the mobile terminal 100 or the first frame 101. On the other hand, during the movement in the second direction D2, the second frame 102 contracts to the first frame 101. Thus, the second direction D2 is a direction opposite to the first direction D1, so that the second direction D2 may be a direction in which the second frame 102 moves to become closer to the first frame 101, that is, moves inwardly of the mobile terminal 100 or the first frame 101. When being moved in the first direction D1, such second frame 102 extends and applies a force to the portion of the display unit 151 disposed on the rear face of the mobile terminal 100, so that the portion of the display unit 151 may be disposed on the front face of the mobile terminal 100, and a region for such additional arrangement may be defined. Thus, the second frame 102 may convert the mobile terminal 100 into the second state with the display unit 151 with the relatively extended front face by moving in the first direction D1. On the other hand, when being moved in the second direction D2, the second frame 102 contracts into an original state thereof, and applies a force to the portion of the display unit 151 disposed on the front face of the mobile terminal 100 to return to the rear face of the mobile terminal 100 again. Thus, the second frame 102 may convert the mobile terminal 100 into the first state with the display unit 151 with the relatively contracted front face by moving in the second direction D2. Accordingly, the second frame 102 selectively exposes the display unit 151 to the front face of the mobile terminal 100 depending on the moving direction (e.g., the first or second direction D1 and D2). Accordingly, the mobile terminal 100 may be converted into the first or second state defined above.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 docs not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, as shown in FIG. 5. That is, a front face of the second front portion 1021 may face the rear face of the first front portion 1011. In addition, the rear face of the first front portion 1011 may be in contact with the front face of the second front portion 1021 to stably support the movement of the second frame 102.

The third rear portion 1022 of the second frame 102 may be disposed below the second rear portion 1013 of the first frame 101. That is, the front face of the third rear portion 1022 may face the rear face of the second rear portion 1013. In addition, the rear face of the second rear portion 1013 may be in contact with the front face of the third rear portion 1022 to stably support the movement of the second frame 102. Because of such arrangement, the third rear portion 1022 may be exposed to the outside of the first frame, more precisely, of the second rear portion 1013, and may be coupled to the display unit 151.

Alternatively, when the second rear portion 1013 is made of a transparent material, the second rear portion 1013 may form an outer shape of the rear face of the mobile terminal. The second rear portion 1013 may be positioned rearward of the third rear portion 1022 of the second frame, and the flexible display may be disposed between the second rear portion 1013 and the third rear portion 1022 in the first state.

When the second rear portion 1013 is made of a material such as a transparent glass to form the outer shape of the rear face of the mobile terminal, the first rear portion 1012 may be implemented using the same member as the second rear portion 1013. That is, the camera 121, the flash or the sensing unit 140, and the like may be arranged by partially coating the plate-shaped member of the transparent glass material to not allow the internal components to be visible and by not coating only a required portion.

In addition, the second frame 102 may expand and contract the size of the mobile terminal 100 itself, particularly the front face of the mobile terminal 100 by the expansion and the contraction in the first and second directions D1 and D2. Thus, the display unit 151 should move by such extended or reduced front face size to obtain the intended first and second states. However, when being fixed to the second frame 102, the display unit 151 may not be moved smoothly to be adapted for the front face of the mobile terminal 100 that is expanded or contracted. For this reason, the display unit 151 may be movably coupled to the second frame 102. More specifically, the display unit 151 may include a first side edge (or side end) 151*d* disposed on the front face of the mobile terminal 100 and a second side edge 151*c* opposite to the first side edge 151*d* and disposed on the rear face of the mobile terminal 100. The first side edge 151 may be disposed on the front face of the first frame 101, that is, the front face of the first front portion 1011 thereof, and may be disposed adjacent to the side portion of the mobile terminal 100, that is, the first side portion 101*a* of the first frame. On the other hand, since the second side edge 151*e* is adjacent to the rear face of the mobile terminal 100 and the third rear portion 1022 of the second frame 102, the second side edge 151*e* may is be coupled the third rear portion 1022 of the second frame 102 to be movable in the first and second directions D1 and D2. In addition, since the display unit 151 is not structurally strong, a third frame 103 may be coupled to the second side edge 151*e*. The third frame 103 may be formed of a plate-shaped member extending in the longitudinal direction of the mobile terminal 100. Accordingly, the third frame 103 may be coupled to the second frame, that is, the third rear portion 1022 thereof to be movable in the first and second directions D1 and D2 instead of the second side edge 151*c*. In addition, the second frame 102 may include a slot 1025 extending in the lateral direction of the mobile terminal 100 or the second frame 102, that is, the direction perpendicular to the longitudinal direction thereof. Further, the third frame 103 may be stably moved while being guided by the slot 1025. The third frame 103 may include, for example, a projection inserted into the slot 1025 for the movement along the slot 1025.

Referring to FIGS. 3 to 5, in connection with such configuration of the first to third frames 101, 102, and 103, the display unit 151 may include a first region 1511 extending from one side thereof, that is, the first side edge 151*d* toward the second side edge 151*c* by a predetermined length, and a second region 1512 disposed opposite the first region 1511, and extending from the second side edge 151*e* toward the first side edge 151*d* by a predetermined length. In addition, the display unit 151 may include a third region 1513 disposed between the first and second regions 1511 and 1512. Such first to third regions 1511, 1512, and 1513 may be connected to each other, and may form a continuous body of the display unit 151. In addition, as described above, for the movement of the third region 1513 toward the front face or the rear face of the mobile terminal 100 depending on the moving direction of the second frame 102, the first region 1511 may be fixed so as not to move to the front face of the mobile terminal 100, and the second region 1512 may be provided to be movable on the rear face of the mobile terminal. Such configuration of the display unit 151 will be described in more detail below.

The first region 1511 may be disposed on the front face of the mobile terminal 100, more specifically, the first frame 101, that is, on the front face of the first front portion 1011. The first region 1511 is fixed to the first frame 101, that is, the front face of the first front portion 1011 so as not to be moved during the movement of the second frame 102, and thus, the first region 1511 may always be exposed to the front face of the mobile terminal 100. The third region 1513 may be adjacent to the first region 1511, and may extend into the second frame 102 and rolled on the roller 1028. The third region 1513 may consecutively extend out of the second frame 102 again and partially cover the second frame 102, that is, the rear face of the third rear portion 1022. Further, the second frame 102, that is, the third rear portion 1022, is adjacent to the first frame 101, that is, the second rear portion 1013 and together forms the rear case of the mobile terminal 100, so that it may be described that the third region 1513 is also disposed on the rear face of the first frame 101.

The second region 1512 may be adjacent to the third region 1513 and may be disposed on the rear face of the mobile terminal 100, more specifically, on the second frame, that is, the rear face of the third rear portion 1022 thereof. The second region 1512 may be coupled to the third frame 103 without being directly coupled to the second frame 102. As shown in FIG. 4 (*b*), the slot 1025 extending in the lateral direction (e.g., the direction perpendicular to the longitudinal direction of the mobile terminal 100) to the second frame 102, that is, to the third rear portion 1022 is defined. Further, the third frame 103 may move along the slot 1025. In FIG. 4 (*b*), it is shown that the slot 1025 is defined in the rear face of the second frame 102, but may be defined in the side face of the second frame 102. Although the second region 1512 may move in the first or second direction D1 or D2 with respect to the second frame 102 together with the third frame 103, the movement of the second region 1512 may be restricted within the rear face of the mobile terminal 100 by the slot 1025. That is, the second region 1512 does not move out of the second frame 102 even when the second frame 102 is extended or contracted, and may move along the slot 1025 within the second frame 102 by the extended or contracted distance of the second frame 102. Accordingly, the second region 1512 may always be exposed to the rear face of the mobile terminal 100.

As a result, the first region 1511 may be disposed on the front face of the mobile terminal 100 and may be always exposed to the front face regardless of the movement of the second frame 102, and the second region 1512 may be disposed on the rear face of the mobile terminal 100 and may be always exposed to the rear face regardless of the movement of the second frame 102. In addition, the third region 1513 may be disposed between the first and second regions 1511 and 1512, and may be selectively placed on the front face or the rear face of the mobile terminal 100 depending on the moving directions D1 and D2 of the second frame 102.

Because of such selective placement of the third region 1513, as shown in FIG. 4 (*b*), the second rear portion 1013 of the first frame 101 is covered by the second and third regions 1512 and 1513 and the third rear portion 1022 of the display unit 151 in the first state, but the third region 1513 moves to the front face of the mobile terminal 100 in the second state, and the third rear portion 1022 also moves in the first direction D1, so that the mobile terminal 100 may be exposed to the outside. In addition, the second front portion 1021 of the second frame 102 is disposed below the first front portion 1011 of the first frame 101 in the first state, but is moved out of the first frame 101 and supports the third region 1513 of the display unit 151 disposed on the front face of the mobile terminal 100 in the second state.

Since the first and second regions 1511 and 1512 are always respectively arranged on the front face and the rear face of the mobile terminal 100, curvatures of the first region 1511 and the second region 1512 do not change, and the first region 1511 and the second region 1512 may be maintained in a flat basic state. However, the third region 1513 may be rolled on the roller 1028 and bent in the second frame 102. When converting from the first state to the second state, the third region 1513 may extend from the second frame 102 to the front face of the mobile terminal 100 while being rolled on the roller 1028 in one direction. On the other hand, when converting from the second state to the first state, the third region 1513 may be retracted from the front face of the mobile terminal 100 to the second frame 102 while being rolled on the roller 1028 in the opposite direction, and at the same time, may return to the rear face of the mobile terminal 100 from the second frame 102. A specific location of the foldable mobile terminal in a form of being spread like a book is easily damaged because only the specific location is folded repeatedly. On the other hand, the deformed portion of the flexible display 151, that is, a portion rolled on the roller 1028, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

As shown in FIGS. 3A, 4A, and 5A, the second frame 102 is fully retracted into the first frame 102 in the first state. Therefore, only the first region 1511 of the display unit 151 fixed to the front face of the first frame 101 may be exposed to the front face of the mobile terminal 100. Such first region 1511 may be fixed and supported to the first frame 101, that is, the first front portion 1011 thereof. In addition, a major portion of the third region 1513 may be disposed on the rear face of the mobile terminal 100 together with the second region 1512, and the third region 1513 may be disposed in the second frame 102 while being partially rolled on the roller 1028. The third region 1513 of the rear face of the mobile terminal 100 may be supported by the second frame, that is, the third rear portion 1022 thereof. The second region 1512 may be fixed by the third frame 103 disposed on the second frame (e.g., the third rear portion 1022) and may be movably coupled to the second frame 1012.

In such first state, when the second frame 102 moves in the first direction D1, the mobile terminal 100 may be converted into the second state. As shown in FIGS. 3B, 4B, and 5B, the second frame 102 may extend from the first frame 101 by the movement in the first direction D1, and may increase the overall size of the mobile terminal 100, in particular, the front face thereof. During the movement in the first direction D1, the second frame 102 may apply a force, that is, a tension, to the display unit 151 in the first direction D1. The display unit 151 is fixed to the first frame 101 but is coupled to the second frame 102 to be movable using the third frame 103, so that the force applied by the second frame 102 allows the third region 1513 to be rolled out from the roller 1028 of the second frame 102 to the front face of the mobile terminal 100. That is, the third region 1513 may be withdrawn (or pulled out) from the second frame 102 or extend to (or move out of) the second frame 102. At the same time, the third region 1513, particularly, the portion located on the rear face of the third region 1513 may be rolled into the roller 1028 of the second frame 102 from the rear face, or may be inserted (or pushed in), retracted, or moved into the second frame 102. Not an entirety of the third region 1513 is withdrawn from the second frame 102 to the front face of the mobile terminal 100, and a portion of the third region 1513 may be disposed in the second frame 102 while still being rolled on the roller 1028. In addition, for the smooth movement of the third region 1513, the second region 1512 may also move in the first direction D1 with respect to the second frame 102 together with the third frame 103. In addition, as described above, the second region 1512 and the third frame 103 may be constrained to the second frame 102 and move in the first direction D1 with respect to the first frame 101 together with the second frame 102. Accordingly, the second region 1512 and the third frame 103 may move in the first direction D1 relative to the first frame 101 as well as the second frame 102, and accordingly, move a distance longer than the moved distance of the second frame 102. Thus, because of such long distance movement in the first direction D1 of the second region 1512, the third region 1513 may be smoothly extended to the front face of the mobile terminal 100. Further, for the movement of the third region 1513, which is proportional to the expansion of the second frame 102, the movement of the second region 1512 and the third frame 103 in the first direction D1 may be performed simultaneously with the movement of such third region 1512 and second frame 102 in the first direction D1 to be proportional to the movement of third region 1513 and second frame 102.

When the second frame 102 is fully extended in the first direction D1, the first and third regions 1511 and 1513 may be arranged on the front face of the mobile terminal 100, and only the second region 1512 may be disposed on the rear face of the mobile terminal 100. Such first and third regions 1511 and 1513 may be supported by the first frame (e.g., the first front portion 1011 thereof) and the second frame (e.g., the second front portion 1021 thereof). In addition, the second frame 102, e.g., the third rear portion 1022 thereof exposes the second rear portion 1013 of the first frame while extending in the first direction D1, and supports the moving third region 1513. Therefore, in the second state, the mobile terminal 100 may have the extended front face display unit 151.

On the other hand, when the second frame 102 moves in the second direction D2 in the second state, the mobile terminal 100 may again return into the first state as shown in FIGS. 3A, 4A, and 5A. The second frame 102 may be contracted to the first frame 101 by the movement in the second direction D2, and may reduce the overall size of the mobile terminal 100, particularly the front face thereof. The movement of the display unit 151 during such movement of the second frame 102 may be performed in a reverse order of the movement in the first direction D1 described above. In brief, the third region 1513 may be rolled from the front face of the mobile terminal 100 into the roller 1028 of the second frame 102, or may be inserted, retracted, or moved into the second frame 102. At the same time, the third region 1513 may be rolled, withdrawn, extended, or moved out of the roller 1028 of the second frame 102 to the rear face of the mobile terminal 100. Not the entirety of the third region 1513 may be withdrawn from the second frame 102 to the rear face of the mobile terminal 100, and the portion of the third region 1513 may still be placed in the second frame 102 while still being rolled on the roller 1028. In addition, for such smooth movement of the third region 1513, the second region 1512 may also move in the second direction D2 with respect to the second frame 102 together with the third frame 103. The second region 1512 and the third frame 103 may be constrained to the second frame 102 to move in the second direction D2 with respect to the first frame 101 together with the second frame 102. Accordingly, the second region 1512 and the third frame 103 may move relatively in the second direction D2 with respect to not only the second frame 102 but also the first frame 101. As a result, the second region 1512 and the third frame 103 may move in the second direction D2 a distance larger than the moved distance of the second frame 102. Thus, because of such long distance movement of the second region 1512, the third region 1513 may be smoothly returned to the rear face of the mobile terminal 100. Further, for the movement of the third region 1513 proportional to the contraction of the second frame 102, the movements of the second region 1512 and the third frame 103 in the second direction D2 may be performed simultaneously with the movements of the third region 1512 and the second frame 102 in the second direction D2 to be proportional to the movements of the third region 1513 and the second frame 102. When the second frame 102 is completely contracted in the second direction D2, the mobile terminal 100 may be converted into the first state as described above, and may have the display unit 151 with the front face that is relatively reduced in comparison with the second state in the first state.

Figure 6:
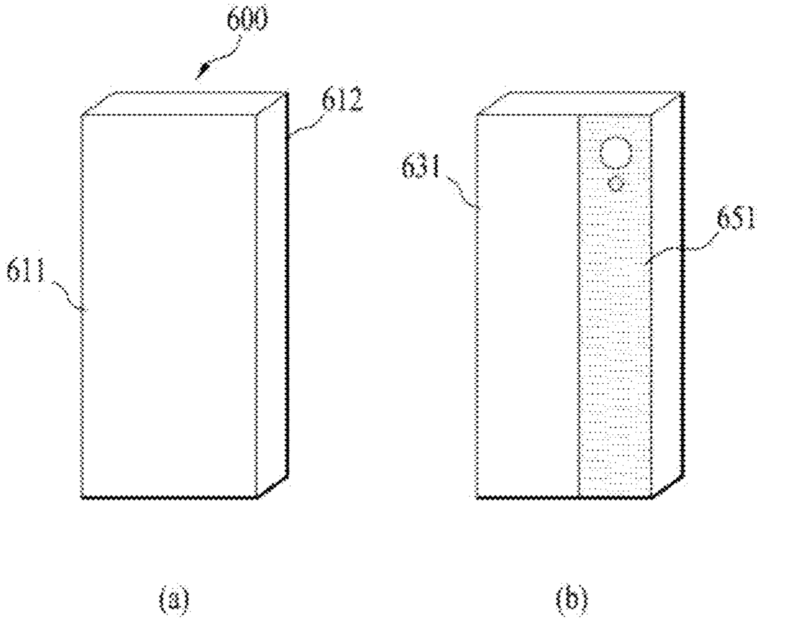
FIG. 6 is a diagram showing a display provided to a front side, one lateral side and a rear side of a mobile terminal of the present disclosure.

FIG. 6 is a diagram showing a display provided to a front side, one lateral side and a rear side of a mobile terminal of the present disclosure.

A mobile terminal 600 of the present disclosure may include a body varying in size and first to third displays 611 to 613 located on the body. As shown in FIG. 6 (*a*), the first display 611 may be located on a front side of the mobile terminal 600 and the second display 612 may be located on one lateral side of the mobile terminal 600. The body is expanded in a direction of the one lateral side, and the first display 611 may be expanded together as well. As shown in FIG. 6 (*b*), the mobile terminal 600 may include the third display 613 located on a rear side of the mobile terminal 600 and a rear part 651 provided with a camera and the like. The mobile terminal 600 of the present disclosure includes a mobile terminal of a rollable type in which the third display 613 is reduced as much as the first display 611 is expanded.

Figure 7:
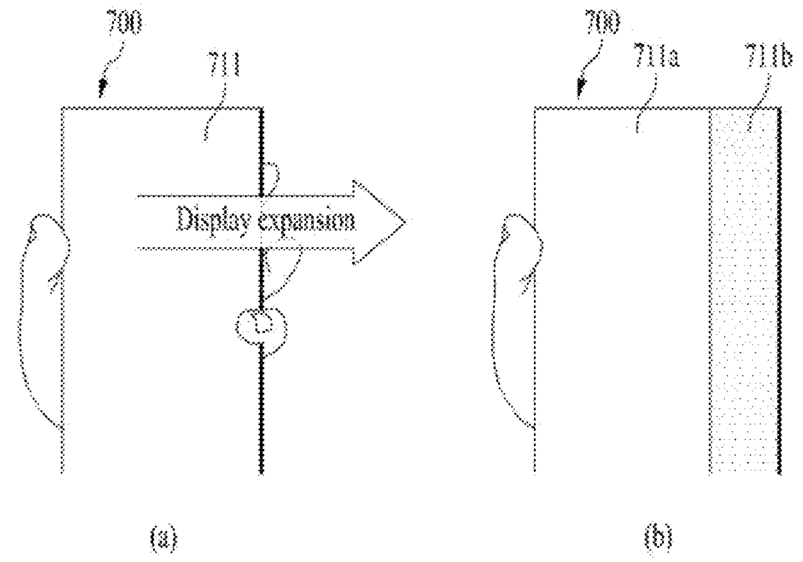
FIG. 7 is a diagram showing a process for expanding a display located on a front side of a mobile terminal.

FIG. 7 is a diagram showing a process for expanding a display located on a front side of a mobile terminal.

Assuming that a display located on a front side is referred to as a first display 711 for convenience, as shown in FIG. 7 (*a*), a mobile terminal 700 of the present disclosure may have the first display 711 expanded in one lateral side direction. Hence, as shown in FIG. 7 (*b*), the first display 711 may include a fixed part 711*a* having a fixed size in the first display and a variable part 711*b* varying for expansion. As described above, a size of a third display located on a rear side may be variable in response to a variable size of the variable part 711*b*.

Figure 8:
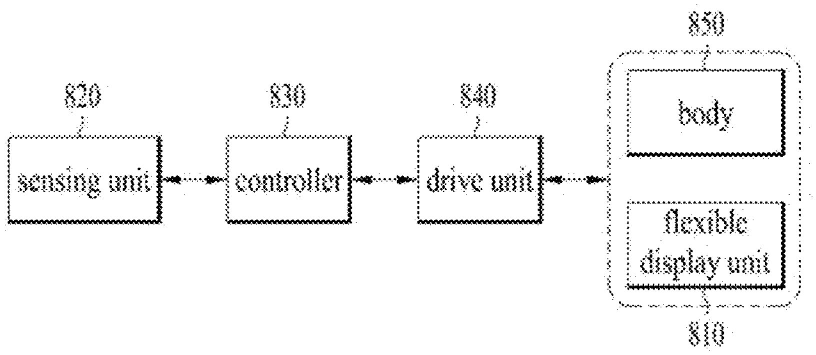
FIG. 8 is a block diagram to describe a method of controlling a mobile terminal of the present disclosure.

FIG. 8 is a block diagram to describe a method of controlling a mobile terminal of the present disclosure.

A mobile terminal of the present disclosure includes a body 850 varying in size, a flexible display 810 including a first display located on a front side of the body 850, a second display located on one lateral side of the body 850 and a third display located on a rear side of the body 850, a drive unit 840 changing a size of the body 850 and a size of the first display, a sensing unit 820 detecting an input signal, and a controller 830 releasing the locking of the mobile terminal if an input signal matches a preset pattern and controlling the drive unit 840 to expand a size of the first display. In addition, as a total area of the flexible display 810 including the first to third display is constant, the flexible display 810 is characterized in that a size of the third dos[;au decreases in response to an increasing size of the first display.

Accordingly, as shown in FIG. 8, when the sensing unit 820 detects an input signal of a preset pattern, the signal is forwarded to the controller 830, and thus the controller 830 may control the drive unit 840 to change a size of the body 850 and a size of the first display of the flexible display 810. In addition, the input signal includes a knock code through a user's touch input to the flexible display 810. Here, the knock code is characterized in including a touch input of knocking a prescribed region of the flexible display 810 consecutively within a reference time. In some implementations, the flexible display 810 may be regarded as playing the same function as the flexible display 151 mentioned in FIG. 3 and FIG. 4.

Figure 9:
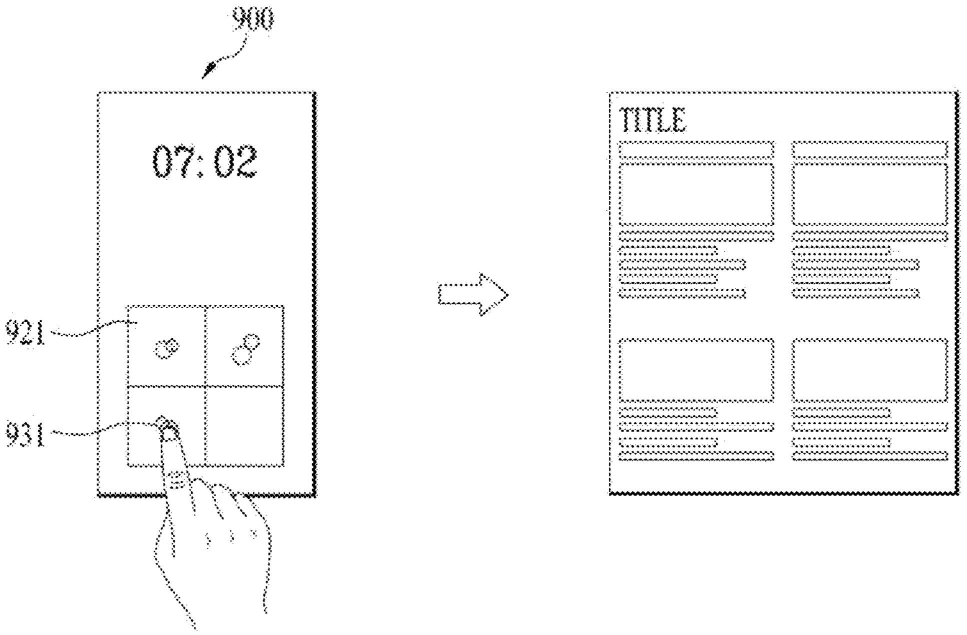
FIG. 9 is a diagram showing a process for performing unlocking and display expansion of a mobile terminal by inputting a knock code.

FIG. 9 is a diagram showing a process for performing unlocking and display expansion of a mobile terminal by inputting a knock code.

As described above, the knock code is a touch input of consecutively knocking a prescribed region of a flexible display within a reference time. The reference time may be set to a predetermined time at the beginning of the product release, and may be reset later by a user. In addition, as shown in FIG. 9, the prescribed region may include a region including a plurality of divided grids on a display of a mobile terminal 900. Hence, when a knock code 931 inputted by a user is a knock code of a preset pattern, the locking is released as soon as a first display located on a front side may be expanded. In doing so, a home screen or a screen of a work finally performed by a user may be displayed on the first display. In addition, in case of the knock code, individual regions on a plurality of grids are touched and a sequence of the touched grids may become a password to form a pattern. Yet, the present disclosure is non-limited by such a pattern and may include various knock code patterns that can be easily derived by those skilled in the art.

Figure 10:
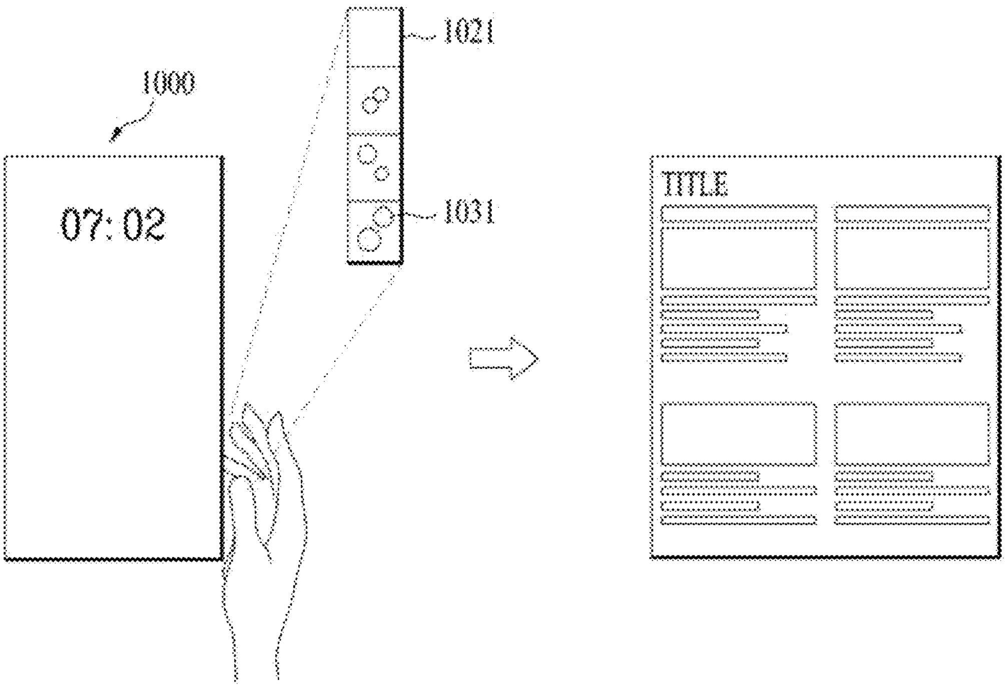
FIG. 10 is a diagram showing a process for performing unlocking and display expansion of a mobile terminal by inputting a knock code onto a display located on one lateral side of a mobile terminal.

FIG. 10 is a diagram showing a process for performing unlocking and display expansion of a mobile terminal by inputting a knock code onto a display located on one lateral side of a mobile terminal.

As described above, a mobile terminal 1000 of the present disclosure may include a second display on a lateral side part in a direction in which a first display located on a front side is expanded. Hence, as shown in FIG. 10, the locking release (i.e., unlocking) and display expansion of the mobile terminal 1000 can be performed through a knock code 1131. Here, a region to which the knock code 1031 is inputted corresponds to a prescribed region 1021 of a second display located on a lateral side of the mobile terminal 1000, and the region may include a plurality of divided grids.

Figure 11:
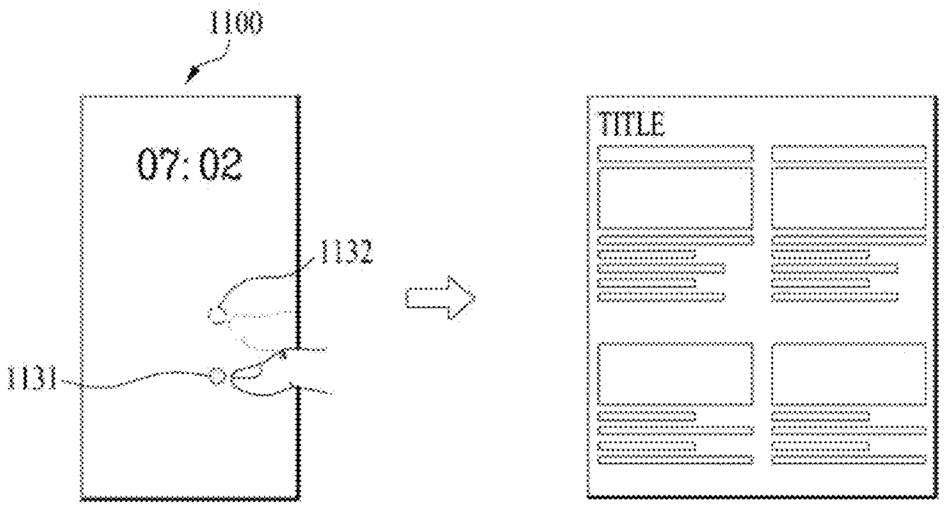
FIG. 11 is a diagram showing a process for performing unlocking and display expansion of a mobile terminal by inputting a knock code onto a display located on front and rear sides of a mobile terminal.

FIG. 11 is a diagram showing a process for performing unlocking and display expansion of a mobile terminal by inputting a knock code onto a display located on front and rear sides of a mobile terminal.

A mobile terminal 1100 of the present disclosure may include a first display located on a front side and a third display located on a rear side. Hence, a user performs a knock code action on a prescribed region of each of the displays, thereby expanding the first display located on the front side of the mobile terminal 100 as soon as releasing the locking. For example, as shown in FIG. 11, in combination of a first knock code 1131 performed on the first display of the front side and a second knock code 1132 performed on the second display of the rear side, the unlocking of the mobile terminal 1100 and display expansion can be achieved.

Figure 12:
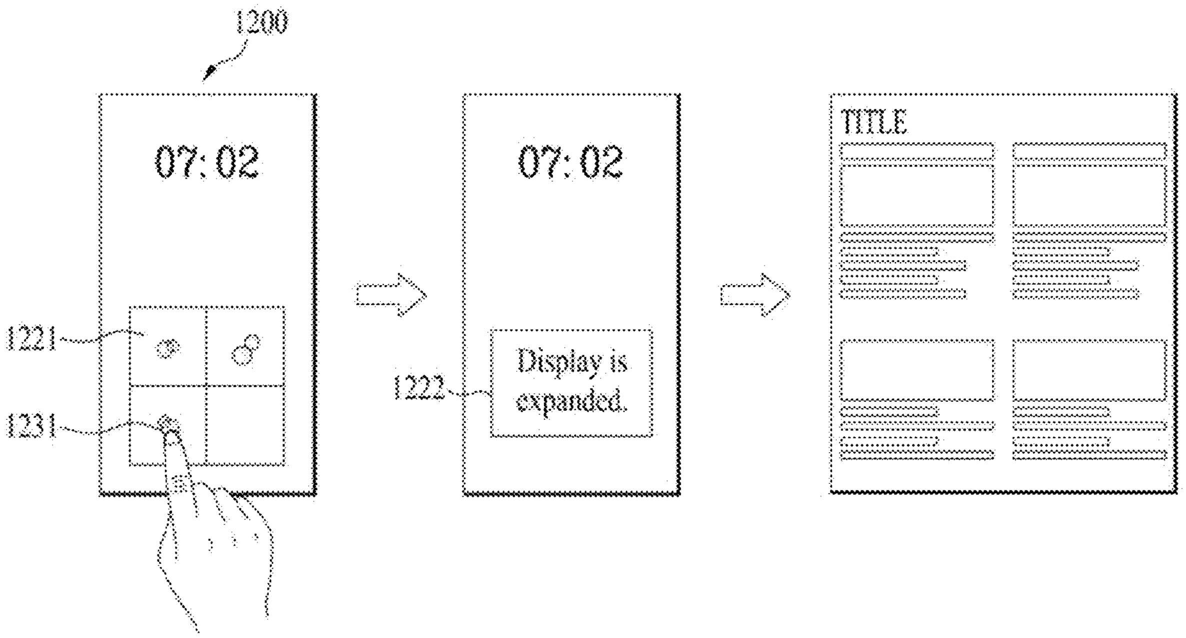
FIG. 12 is a diagram showing that a guide text is displayed on a display when the display of a mobile terminal is expanded by a knock code.

FIG. 12 is a diagram showing that a guide text is displayed on a display when the display of a mobile terminal is expanded by a knock code.

As shown in FIG. 12, when a user inputs a knock code 1231 to a prescribed region 1221 on a display of a mobile terminal 1200 of the present disclosure and the knock code 1231 matches a preset pattern, the locking of the mobile terminal 1200 may be released and the display may be expanded. In addition, during such a process, as shown in FIG. 12, a guide text 1222 indicating that the display is expanded is displayed on the display, thereby providing the user with convenience.

Figure 13:
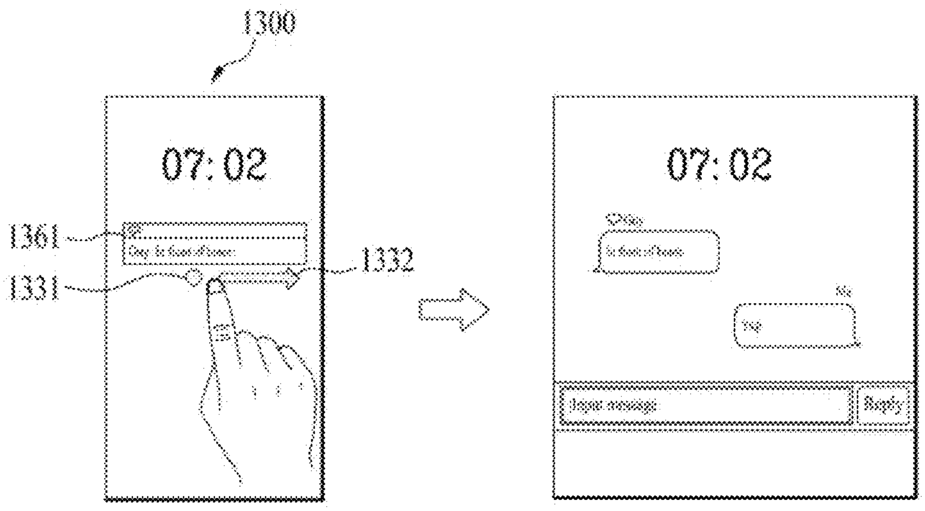
FIG. 13 is a diagram showing a process for when a notification is received by a mobile terminal, performing unlocking and display expansion of a mobile terminal through a knock code and a gesture action with respect to the notification.

FIG. 13 is a diagram showing a process for when a notification is received by a mobile terminal, performing unlocking and display expansion of a mobile terminal through a knock code and a gesture action with respect to the notification.

As shown in FIG. 13, a mobile terminal 1300 may receive a notification 1361 related to a phone call, a message or a Social Network Service (SNS) in a locked state. In general cases, locking is released and a process for executing an application corresponding to the notification by clicking the corresponding notification is performed. Moreover, when a display is expandable like the mobile terminal 1300 of the present disclosure, a process for selecting whether to expand a display may be performed additionally. Yet, as shown in FIG. 13, when the notification 1361 is received in the locked state of the mobile terminal 1300, unlocking, display expansion and application execution for the notification 1361 may be performed by a knock code 1331 and a gesture action 1332 with respect to the notification 1361 only. The knock code 1331 may be separately set by a user, or may be basically set as a simple knock code when the product is shipped. For example, the knock code is set by touching the notification 1361 twice within a predetermined time, and then the above functions may be performed by the gesture action 1332. In addition, the gesture action 1332 may include a touch & drag action after the input of the knock code 1331. For example, functions (unlocking, display expansion, and application for the notification 1361) described in FIG. 13 may be executed by performing touch & drag in a direction in which a first display of the mobile terminal 1300 is expanded after the knock code 1331.

Figure 14:
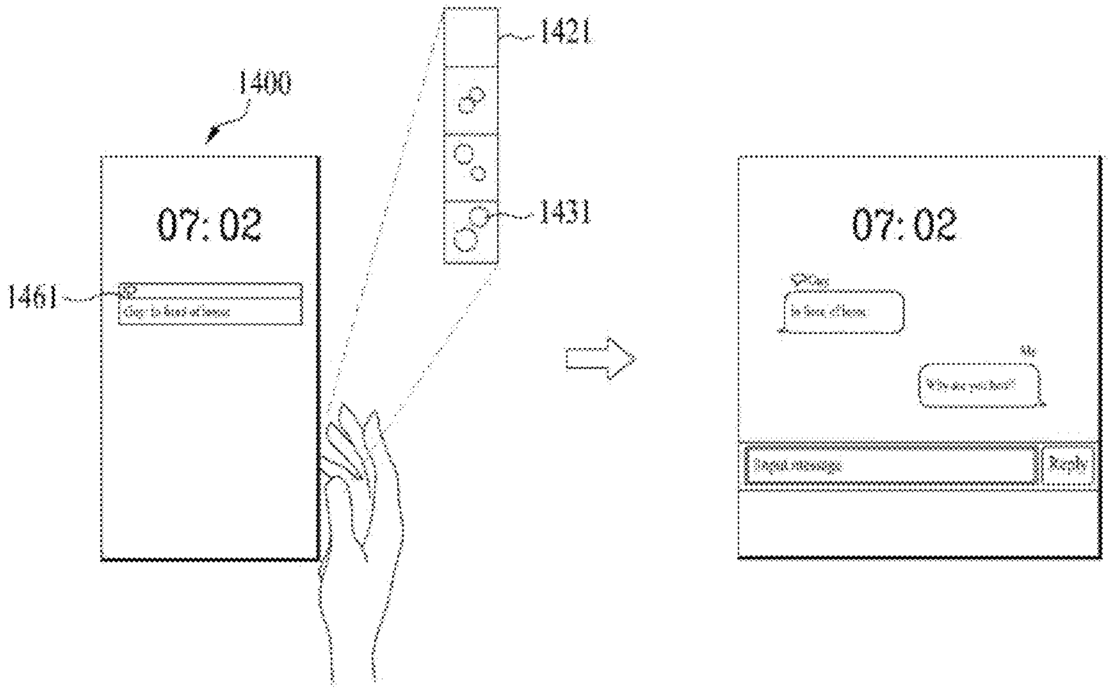
FIG. 14 is a diagram showing a process for when a notification is received by a mobile terminal, performing unlocking and display expansion of a mobile terminal through a knock code input to one lateral side of the mobile terminal with respect to the notification.

FIG. 14 is a diagram showing a process for when a notification is received by a mobile terminal, performing unlocking and display expansion of a mobile terminal through a knock code input to one lateral side of the mobile terminal with respect to the notification.

FIG. 14 shows a method of utilizing a second display located on one lateral side of a mobile terminal 1400, whereas FIG. 13 shows a knock code and a gesture action on a notification region. As illustrated in FIG. 14, when a notification 1461 occurs, a knock code 1431 corresponding to a preset pattern may be inputted to a prescribed region 1421 of a second display. When the knock code 1431 is the same as the preset pattern, as shown in FIG. 14, unlocking of the mobile terminal 1400, display expansion and an application for notification 1461 may be executed.

Figure 15:
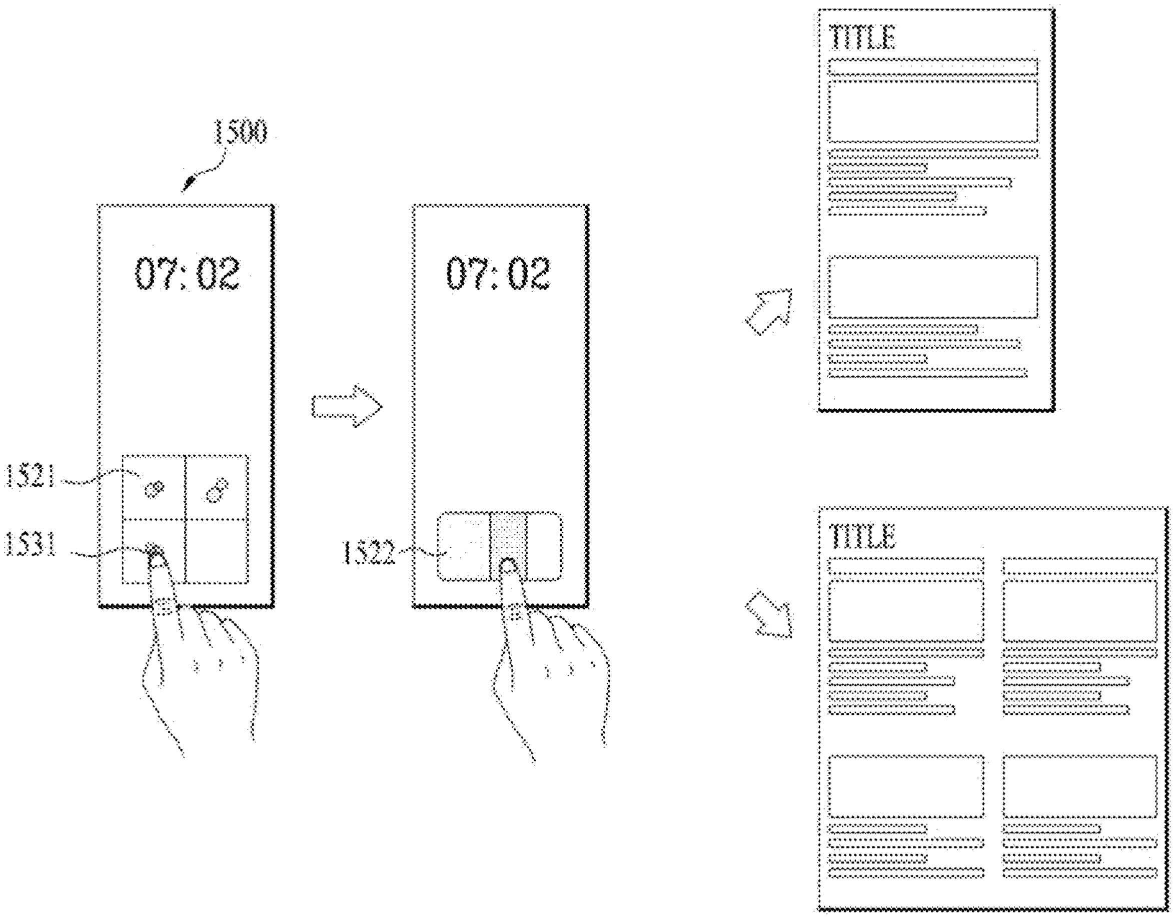
FIG. 15 is a diagram showing that a separate display size selection menu is provided when a mobile terminal expandable in a plurality of sizes is unlocked by a knock code.

FIG. 15 is a diagram showing that a separate display size selection menu is provided when a mobile terminal expandable in a plurality of sizes is unlocked by a knock code.

In a mobile terminal 1500 of the present disclosure, a size of a first display located on a front side may be expanded as much as a size of a third display located on a rear side is contracted. In addition, the expansion may go through a plurality of steps, whereby there may be a plurality of expandable sizes of the first display.

Accordingly, as shown in FIG. 15, when a knock code 1531 is inputted to a prescribed region 1521 on a display of the mobile terminal 1500, a selection menu 1522 for selecting any one of a plurality of the expandable sizes may be displayed on the display. A user may determine a size of an expanded display by selecting any one from the selection menu 1522.

Figure 16:
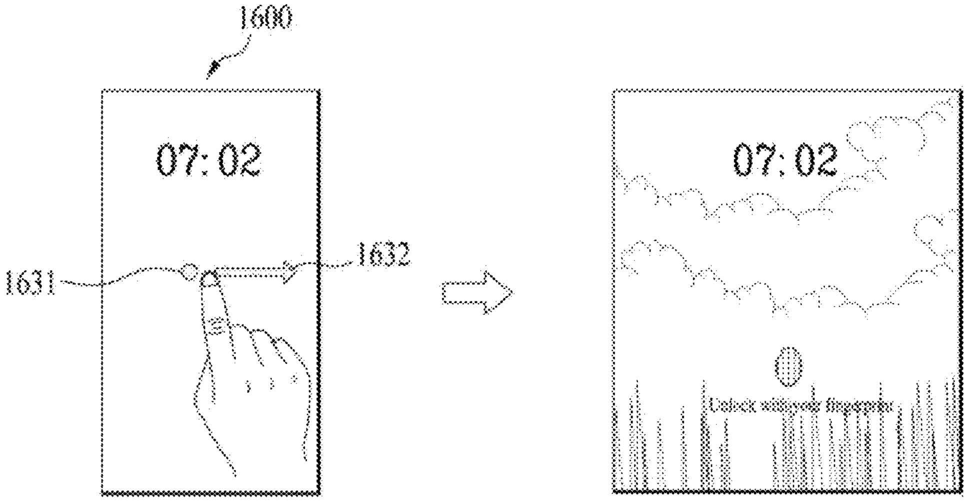
FIG. 16 is a diagram showing a process for entering a display expansion and standby screen state of a mobile terminal through a knock code and a gesture action.

FIG. 16 is a diagram showing a process for entering a display expansion and standby screen state of a mobile terminal through a knock code and a gesture action.

In some cases, a user may just desire to expand a display of a mobile terminal 1600 and enter a standby screen directly without unlocking the mobile terminal 1600. Even in this case, a knock code 1631 and a gesture action 1632 are preset, and when an input signal matches a set pattern, a display may be expanded and a standby screen may be displayed on the expanded display. The standby screen is in a locked screen state in which the mobile terminal 1600 is still locked, and the mobile terminal 1600 may be unlocked through fingerprint recognition or separate pattern recognition after the display expansion. In addition, the gesture action 1632 may include a swipe action performed in one direction of the mobile terminal 1600, and the one direction may be the same as or different from a direction in which a first display located on a front surface is expanded.

In some implementations, although not shown in the drawing, the unlocking and the display expansion may be possible performed as follows.

Namely, when only a user input for unlocking (e.g., the knock code, fingerprint recognition, or separate pattern recognition) is received without the gesture action, the mobile terminal may perform only the unlocking without the display expansion. That is, the mobile terminal may display a home screen instead of a lock screen without performing the display expansion.

On the other hand, when a user input for unlocking is consecutively performed (or within a prescribed time) after the user input for unlocking has been performed, the mobile terminal performs the display expansion while performing the unlocking, and the home screen may be displayed on the expanded display instead of the lock screen. In this case, the mobile terminal may display information (e.g., swipe guide graphic) for guiding the gesture to a user in order to notify that the display expansion is possible while performing the unlocking. The information for guiding may be displayed when the user input starts to be performed, or may be displayed at a time point when the user input is completed and authenticated.

Accordingly, from the user's point of view, it is possible to easily select whether to execute the unlocking without the display expansion or to execute the unlocking together with the display expansion.

Meanwhile, in order to expand the display, the mobile terminal does not necessarily have to have the gesture action. For example, even if only the user input for the unlocking is performed without the gesture action, the mobile terminal may be preconfigured to execute the unlocking together with the display extension.

Figure 17:
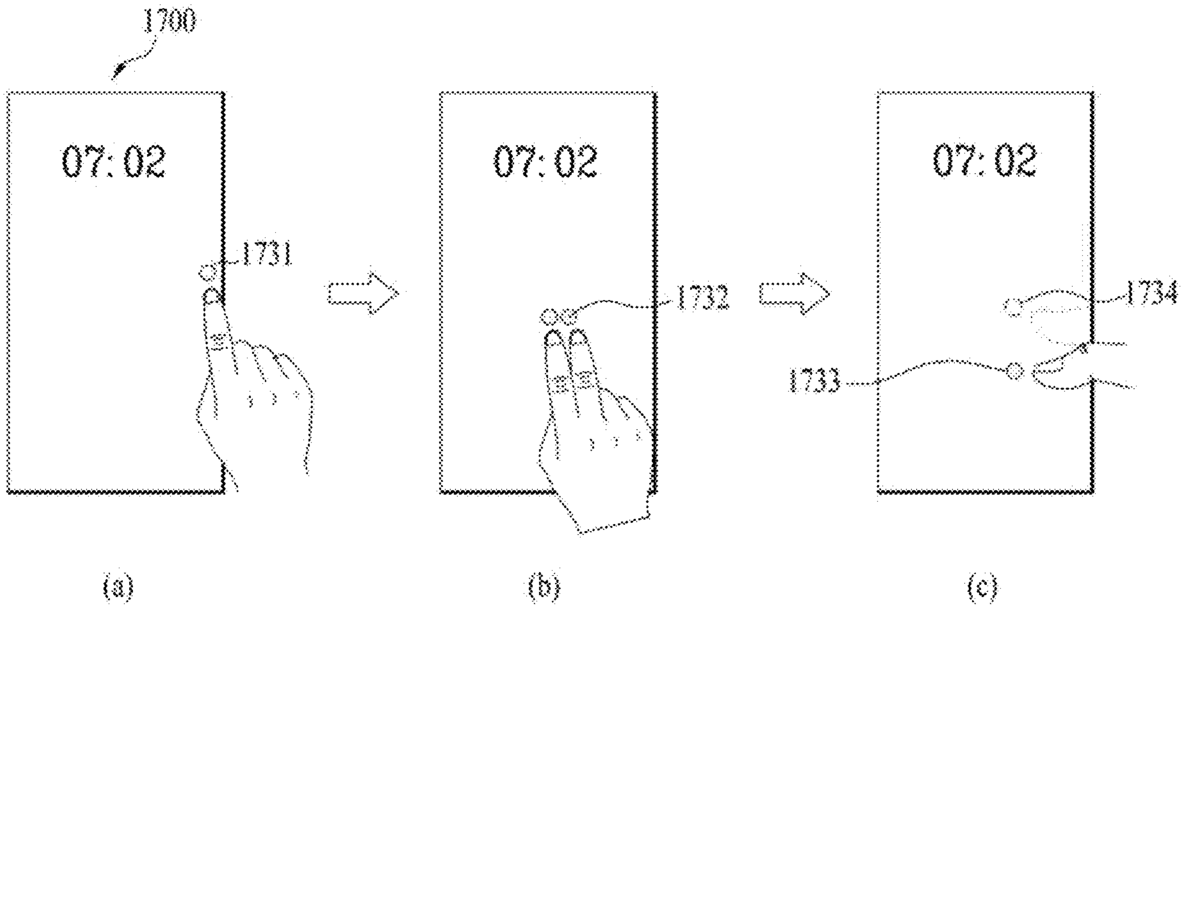
FIG. 17 is a diagram showing embodiments of various knock codes for entering a display expansion and standby screen state of a mobile terminal.

FIG. 17 is a diagram showing embodiments of various knock codes for entering a display expansion and standby screen state of a mobile terminal.

First, in the case of FIG. 17 (*a*), a display extension and a standby screen state may be entered through a knock code 1731 on a second display located on a lateral side of a mobile terminal 1700. As described above, the knock code may mean an action of consecutively knocking a prescribed region of a display within a reference time. In addition, the knock code 1731 may be separately set by a user, or may be basically set as a simple knock code when the product is shipped. For example, a knock code may be set by touching twice a prescribed region on the second display unit within a predetermined time.

In addition, as shown in FIG. 17 (*b*), by performing a knock code 1732 with a plurality of fingers, a display may be expanded and a standby screen state may be entered.

In addition, as shown in FIG. 17 (*c*), a pattern capable of expanding a display and entering a standby screen state may be designated by combining a knock code inputted to a prescribed region of a first display located on a front side and a knock code inputted to a prescribed region of a second display located on a rear side.

The description above is merely illustrative of the technical idea of the present disclosure, and various modifications and changes may be made by those skilled in the art without departing from the main characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments.

The scope of the present disclosure should be construed as being covered by the scope of the appended claims, and all technical ideas falling within the scope of the claims should be construed as being included in the scope of the present disclosure.

What is claimed is:

1. A mobile terminal comprising:

a body variable in size;

a flexible display including a first display located on a front side of the body, a second display located on a lateral side of the body and a third display located on a rear side of the body;

a driver configured to expand a size of the first display;

a sensor configured to detect an input signal; and a processor configured to, based on the input signal matching a preset pattern, release locking of the mobile terminal, control the driver to expand the size of the first display, and control the first display to display a home screen or a screen of a task last performed by a user, wherein the third display is contracted when the first display is expanded.

2. The mobile terminal of claim 1, wherein the input signal includes a knock code input through a touch of the user onto the flexible display.

3. The mobile terminal of claim 2, wherein the knock code comprises consecutive knocks of a prescribed region of the flexible display within a reference time.

4. The mobile terminal of claim 3, wherein the prescribed region includes a plurality of grids, and wherein the knock code corresponds to a password generated from a sequence of touched grids of the plurality of grids that is input by the user.

5. The mobile terminal of claim 4, wherein the prescribed region is located on the second display.

6. The mobile terminal of claim 3, wherein the consecutive knocks comprise consecutive knocks of the prescribed region on the first display and the third display within the reference time.

7. The mobile terminal of claim 2, wherein the processor is further configured to, based on detecting the knock code, control the first display to display a guide text indicating that the size of the first display is expanded.

8. The mobile terminal of claim 2, wherein based on a notification being received when the mobile terminal is in a locked state, and the input signal further including a touch & drag in a specific direction following the knock code, the processor is configured to release the locking of the mobile terminal, control the driver to expand the size of the first display, and execute an application for the notification on the first display.

9. The mobile terminal of claim 8, wherein the specific direction is same as a direction in which the size of the first display is expanded.

10. The mobile terminal of claim 8, wherein the notification is related to at least one of a phone call, a message, or a Social Network Service (SNS).

11. The mobile terminal of claim 2, wherein based on a notification being received when the mobile terminal is in a locked state, and the knock code being detected via the second display, the processor is configured to release the locking of the mobile terminal, control the driver to expand the size of the first display, and execute an application for the notification on the first display.

12. The mobile terminal of claim 2, wherein the first display of the flexible display is expandable into one of a plurality of sizes and wherein based on the knock code being input, the processor is configured to control the first display to display a selection menu for selecting any one of the plurality of sizes.

13. The mobile terminal of claim 12, wherein the selection menu is displayed on a region at which the knock code was input by the user on the first display.

14. A method of controlling a mobile terminal comprising a body variable n size, a flexible display including a first display located on a front side of the body, a second display located on a lateral side of the body and a third display located on a rear side of the body, a driver configured to expand a size of the first display, a sensor configured to detect an input signal and a processor, the method comprising:

based on the input signal matching a preset pattern:

releasing, by the processor, locking of the mobile terminal;

controlling, by the processor, the driver to expand the size of the first display; and controlling, by the processor, the first display to display a home screen or a screen of a task last performed by a user, wherein the third display is contracted when the first display is expanded.

15. The method of claim 14, wherein the input signal includes a knock code input through a touch of the user onto the flexible display.

16. The method of claim 15, wherein the knock code comprises consecutive knocks of a prescribed region of the flexible display within a reference time.

17. The method of claim 16, wherein the prescribed region includes a plurality of grids, and wherein the knock code corresponds to a password generated from a sequence of touched grids of the plurality of grids that is input by the user.

18. The method of claim 17, wherein the prescribed region is located on the second display.

19. The method of claim 16, wherein the consecutive knocks comprise consecutive knocks of the prescribed region on the first display and the third display within the reference time.

20. The method of claim 15, further comprising:

based on detecting the knock code, controlling, by the processor, the first display to display a guide text indicating that the size of the first display is expanded.

* * * * *